United States Patent [19]

Takatoshi

[11] Patent Number: 4,619,351
[45] Date of Patent: Oct. 28, 1986

[54] ENGAGEMENT DEVICE FOR AN ELECTROMAGNETIC SPRING-WOUND CLUTCH

[75] Inventor: Koitabashi Takatoshi, Annaka, Japan

[73] Assignee: Sanden Corporation, Gunma, Japan

[21] Appl. No.: 647,383

[22] Filed: Sep. 5, 1984

[30] Foreign Application Priority Data

May 9, 1983 [JP] Japan .................... 58-137668[U]

[51] Int. Cl.⁴ .................... F16D 27/10; F16D 41/20
[52] U.S. Cl. .................... 192/35; 192/81 C
[58] Field of Search .................... 192/35, 70.19, 70.28, 192/81 C, 84 C, 84 T

[56] References Cited

U.S. PATENT DOCUMENTS

| | | | |
|---|---|---|---|
| 3,735,847 | 5/1973 | Brucken | 192/35 |
| 4,194,607 | 3/1980 | Yamaguchi | 192/84 T |
| 4,243,128 | 1/1981 | Shirai | 192/35 |
| 4,262,787 | 4/1981 | Takefuta et al. | 192/84 T |
| 4,273,226 | 6/1981 | Takefuta et al. | 192/35 |

FOREIGN PATENT DOCUMENTS

| | | | |
|---|---|---|---|
| 138527 | 10/1981 | Japan | 192/84 C |
| 192631 | 11/1982 | Japan | 192/84 C |
| 204331 | 12/1982 | Japan | 192/84 C |
| 619046 | 3/1949 | United Kingdom | 192/35 |

*Primary Examiner*—Lawrence Staab
*Attorney, Agent, or Firm*—Banner, Birch, McKie & Beckett

[57] ABSTRACT

An engagement device for an electromagnetic spring-wound clutch is disclosed. An armature plate member to which one end of a coil wound spring is connected is flexibly connected to a guide member rotatably supported on a cover plate by a plurality of elastic members. The cover plate has a bent portion at its axial terminal end and the guide member is closely fitted against the bent portion to maintained its axial position thereon. Thus, when the electromagnetic coil is not energized, the armature plate is fitted against an axial end of the bent portion due to the recoil strength of the elastic members. Therefore, a predetermined axial air gap between the armature plate and the end plate of the prime mover can be readily maintained.

8 Claims, 3 Drawing Figures

4,619,351

ENGAGEMENT DEVICE FOR AN ELECTROMAGNETIC SPRING-WOUND CLUTCH

BACKGROUND OF THE INVENTION

The present invention relates generally to the field of electromagnetic clutches, and more particularly, is directed to an improved engagement device for an electromagnetic spring-wound clutch.

Electromagnetic spring-wound clutches which may be used to couple a compressor to a prime mover are well known. For example, U.S. Pat. No. 3,735,847 to Brucken discloses the basic construction of an electromagnetic spring-wound clutch. The conventional spring-wound clutch comprises a coaxial input member on which an annular armature plate is rotatably provided along with an output member. A coil-wound spring is wound around the input member and is connected at its respective ends to the armature plate and output member. An electromagnetic coil, which is coaxially disposed in the input member with a small gap therebetween, attracts the armature plate into frictional engagement with the input member, thereby causing the coil-wound spring to be tightly wound around the input member and thus drivably engaging the input member with the output member. When the coil is de-energized, the armature plate disengages from the input member and is returned to a predetermined position due to the recoil strength of the coil wound spring. The coil-wound spring thus releases the input member from rotation relative to the output member.

During disengagement of the armature plate in an electromagnetic clutch of the above construction, the armature plate is maintained in its predetermined position only by the recoil strength of the coil-wound spring. Therefore, the armature plate tends to vibrate during and after disengagement, causing objectional noise and undesirable wear on the coil-wound spring. Moreover, the armature plate does not disengage completely parallel to the imput member, thus increasing the likelihood of the armature plate inadvertently contacting the input member. In one proposed solution to this problem, a plurality of permanent magnets are attached to the armature plate. When the electromagnetic coil is de-energized, the armature plate is returned to its predetermined position by the attractive force of the permanent magnets. The durability of the armature plate with magnets mounted in this manner is greatly diminished, however, because the impact force generated by attraction of the armature plate to the output member directly acts on the permanent magnets. Thus, there is a tendency for the permanent magnets to become dislodged from the armature plate over time. Moreover, abrasive dust particles which form due to friction between the wound spring and the output member and the armature plate and output member are attracted to the permanent magnets. If some of the dust particles settle between the cover plate covering the assembly and the armature plate, the predetermined axial gap between the armature plate and the output member is decreased. Thus, the armature plate may contact the output member without operation of the electromagnetic clutch. When this occurs, the armature plate is subject to an abnormally high rate of wear.

Other proposed solutions for the above-described problem, such as those disclosed in U.S. Pat. No. 4,194,607 issued to Yamaguchi and U.S. Pat. No. 4,262,787 issued to Takafuta et al., are fairly complicated in construction and difficult to assemble, thus lessening the likelihood of their reliable operation. Accordingly, there is a need in the art for an engagement device for an electromagnetic coil-wound clutch which overcomes the above-described deficiencies while at the same time being simple in construction and reliable in operation.

SUMMARY OF THE INVENTION

Therefore, it is an object of the present invention to provide an electromagnetic spring-wound clutch having improved reliability over such clutches known in the prior art.

It is another object of the present invention to provide an electromagnetic spring-wound clutch having improved durability over such clutches known in the prior art.

It is still another object of the present invention to provide an electromagnetic spring-wound clutch which accomplishes the above objects while at the same time being simple in construction and reliable in operation.

The electromagnetic spring-wound clutch in accordance with the present invention comprises a first rotatable member having an axial end plate formed of magnetic material and a second rotatable member coaxially disposed with respect to the first rotatable member. An armature plate is disposed coaxially with respect to the first rotatable member and is frictionally engageable with the first rotatable member. A coil-wound spring is positioned around the first rotatable member and is connected at its respective ends to the second rotatable member and the armature plate. A cover plate is fixed to the second rotatable member and covers the outer peripheral surface of the coil-wound spring. An electromagnetic means associated with the first rotatable member is provided for attracting the armature plate member to the axial end plate of the first rotatable member so that rotative motion of the first rotatable member is transmitted to the second rotatable member through the armature plate and coil-wound spring by operation of the electromagnetic means. A guide member is also rotatably disposed on the outer peripheral surface of the cover plate. A plurality of connecting members are fixed on the guide member through elastic members and connect to the armature plate to maintain the predetermined axial air gap defined between the armature plate and the axial end plate of the first rotatable member.

Further objects, features and other aspects of the present invention will be understood from the detailed description of the preferred embodiment of the invention with reference to the annexed drawings.

DETAILED DESCRIPTION OF THE PREFERRED EMBODIMENTS

Figure 1:
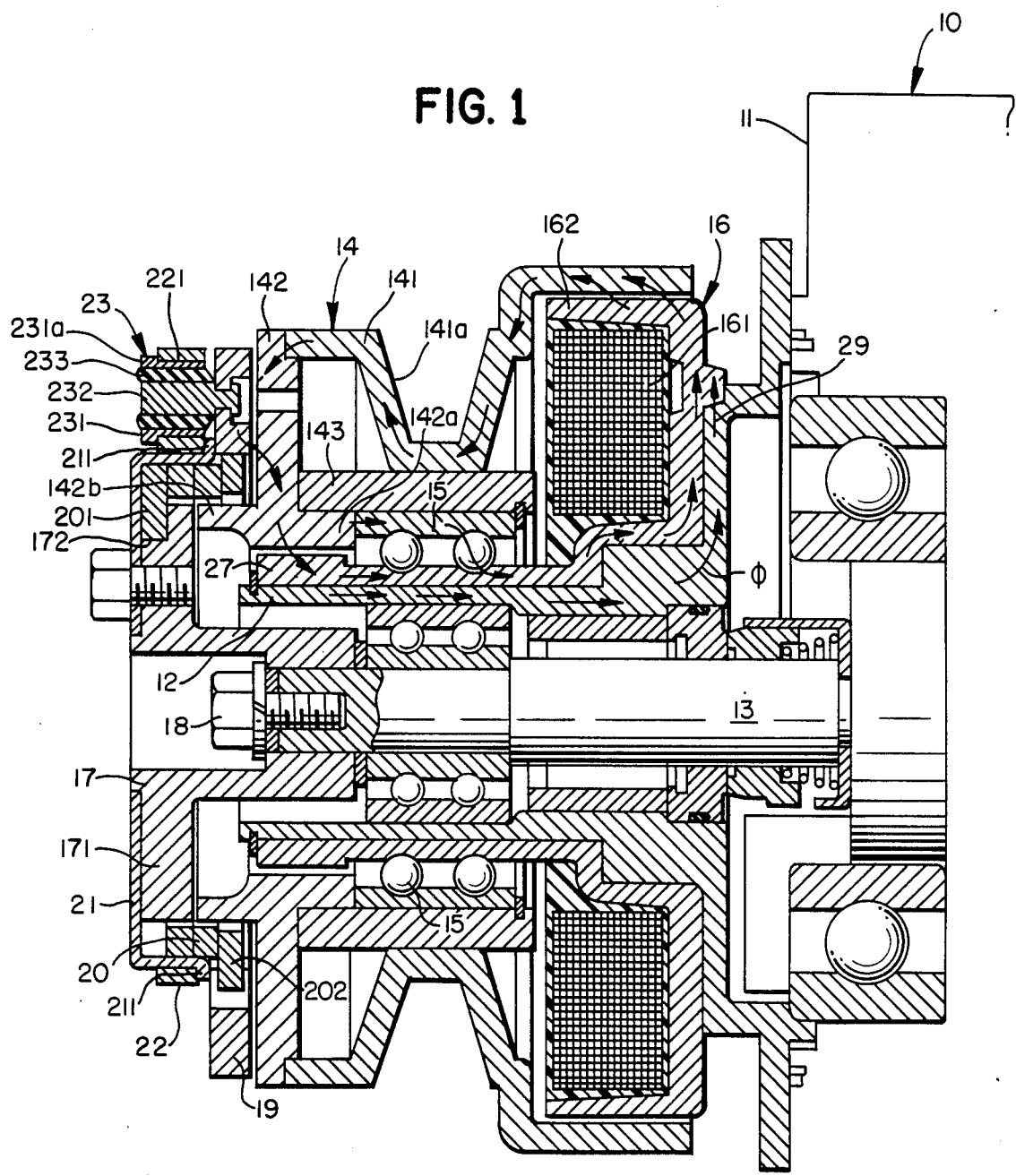
FIG. 1 is a vertical cross sectional view of an electromagnetic spring-wound clutch in accordance with the present invention.

With reference to FIG. 1, an electromagnetic clutch according to one embodiment of the present invention is shown assembled on a compressor for an automobile air conditioning system. Compressor housing 11 of compressor 10 is provided with cantilevered tubular extension 12 surrounding drive shaft 13 of compressor 10. Drive shaft 13 is rotatably supported in compressor housing 11 by bearings.

A pulley 14, which has an axial end plate 142, is rotatably supported on tubular extension 12 by bearings 15 which are mounted on the outer peripheral surface of tubular extension 12. Electromagnetic means 16 comprising magnetic coil 161 and magnetic housing 162 is disposed on tubular extension 12 and fixed to compressor housing 11. Hub 17 is disposed on an outer terminal end of drive shaft 13. Hub 17 is secured to drive shaft 13 by bolt 18 and has a radial flange portion 171 extending radially outwardly to face axial end plate 142 of pulley 14 with a predetermined axial gap. Armature plate 19 is disposed between axial end plate 142 of pulley 14 and radial flange portion 171 of hub 17 in a position concentric with hub 17. Armature plate 19 is moveably connected to flange portion 171 of hub 17 through coil-wound spring 20.

End portion 201 of coil-wound spring 20 is hooked on recess 172 formed on the outer peripheral portion of radial flange portion 171 of hub 17. End 202 of coil-wound spring 20 is hooked on an inner peripheral surface of armature plate 19. Spring cover plate 21 is attached to the outer end surface of flange portion 171 of hub 17 to cover coil-wound spring 20.

Figure 2:
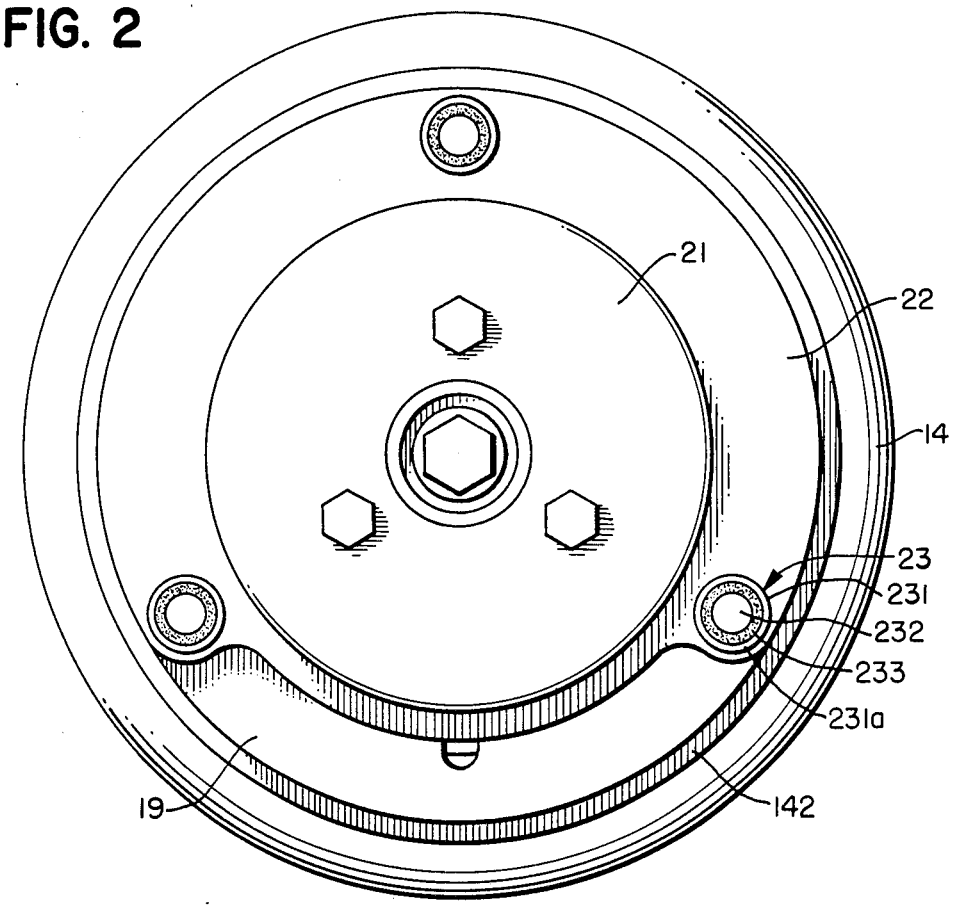
FIG. 2 is a front view of the electromagnetic spring-wound clutch shown in FIG. 1.
Figure 3:
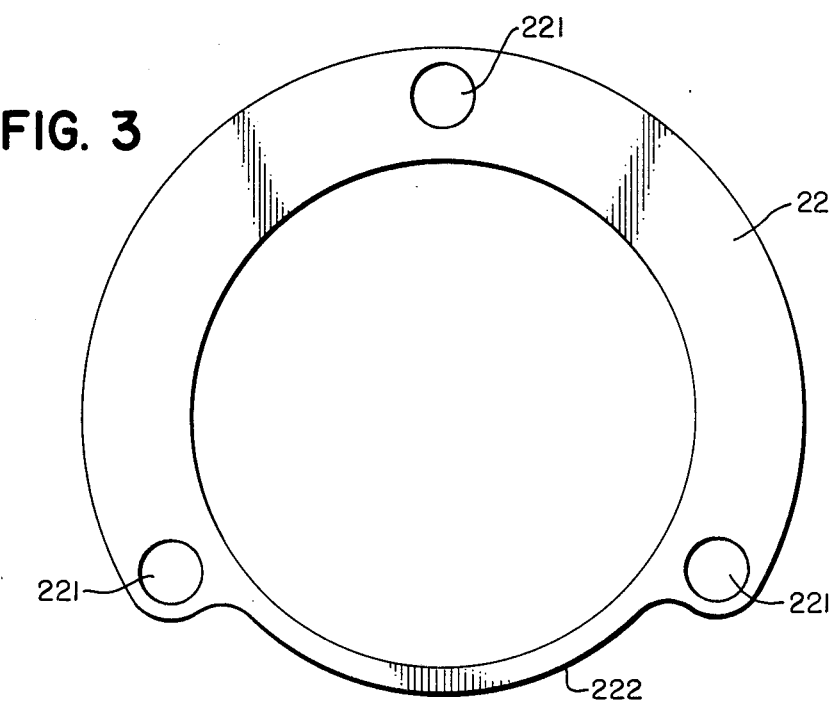
FIG. 3 is a front view of the guide member for the armature plate of the electromagnetic spring-wound clutch shown in FIG. 1.

Pulley 14 comprises outer cylindrical member 141 which has a V-shaped groove 141a for receiving a V-belt in engagement with the engine of the automobile. Pulley 14 also includes axial end plate 142 extending radially inwardly from an end portion of outer cylindrical member 141. The inner end of end plate 142 has an inner axial flange 142a and an outer axial flange 142b axially projecting therefrom in T-shaped cross-section. Flanges 142a and 142b extend along spacer 27 disposed on tubular extension 12 with a small radial air gap to enlarge the passage way for the flow of magnetic flux from coil 161 as will be presently described. The outer peripheral surface of axial flange 142b faces the inner peripheral surface of coil-wound spring 20 with a small air gap therebetween. An annular shaped non-magnetic material member 143 is placed between the inner peripheral surface of outer cylindrical member 141 and the outer surface of the outer race holding bearings 15 for rotatably supporting pulley 14 on bearings 15 and to prevent a leakage or short circuit path of magnetic flux through the open space of pulley 14. Non-magnetic material member 143 is fixed on the inner peripheral surface of outer cylindrical member 141. Annular guide member 22, shown in more detail in FIGS. 2 and 3, is disposed on the outer peripheral surface of spring cover plate 21 to closely fit thereon and is rotatable with respect thereto. More precisely, spring cover plate 21 has a bent portion or flange 211 at its axial terminal end and guide member 22 is fitted on a first axial end portion of the bent portion.

As shown in FIGS. 2 and 3, a plurality of penetrating holes 221 are formed on guide member 22. A plurality of connecting members 23 are fitted into each respective one of penetrating holes 221. Each one of connecting members 23 comprises cylindrical element 231 closely fitted in its respective penetrating holes 221; radial flange portion 231a formed on an end portion of cylindrical element 231 to limit the axial movement of element 231 during assembly of the clutch; and pin 232 disposed through cylindrical element 231 and connected to element 231 by elastic member 233. The end of pin 232 extending from cylindrical element 231 is fixed on armature plate 19 to elastically connect guide member 22 to armature plate 19. Axial movement of guide member 22 along the outer peripheral surface of spring cover 21 is prevented by radial flange portion 211 formed on the outer end portion of spring cover 21. Therefore, armature plate 19 is forced toward guide member 22 to maintain the predetermined axial gap.

When coil 161 is energized, magnetic flux ($\phi$) is produced and flows as indicated by arrows 29 around a closed loop as shown in FIG. 1. The magnetic flux passes through outer cylindrical member 141 of pulley 14, axial end plate portion 142, armature plate 19 and end 202 of coil wound-spring 20. From end 202, the magnetic flux passes through axial flanges 142a and 142b of pulley 14. The flow of magnetic flux flow then separates into two paths as shown by arrows 29. One path passes through spacer 27 and tubular extension 12. The other path passes through the inner and outer race of bearings 15 and tubular extension 12. A leakage or short circuit path across outer cylindrical member 141 to flange 142a or the race holding bearings 15 is prevented by non-magnetic material member 143 of pulley 14.

Armature plate 19 is magnetically attracted to pulley 14 by the above mentioned magnetic flux generated by coil 161 and moves toward pulley 14 against the recoil strength of elastic members 233. Thus, armature plate 19 is brought into frictional engagement with pulley 14 and rotates together with pulley 14. An end portion of coil-wound spring 20 is also rotated together with armature plate 19. As armature plate 19 is rotated together with pulley 14, end portion 201 of coil-wound spring 20 also rotates together with pulley 14. Coil-wound spring 20 thus winds to secure contact around outer axial flange 142b of pulley 14. Therefore, the rotating motion of the automotive engine is transmitted to drive shaft 13 of the compressor through pulley 14, armature plate 19, coil-wound spring 20, leaf-springs 23 and hub 17.

When coil 161 is de-energized, magnetic flux ($\phi$) is no longer produced. Thus, armature plate 19 is separated from axial end plate 142 of pulley 14 and is returned to a position against flange portion 211 of spring cover plate 21 by the bias strength of elastic members 233. Coil-wound spring 20 also unwinds from flange 142b to interrupt the transmission of rotating motion from the automotive engine to the drive shaft of the compressor.

As shown in FIG. 3, cut-out portion 222 is formed on guide member 22 to accommodate a counterbalance mechanism to balance the dynamic unbalance produced in the compressor.

As discussed above, armature plate 19 and guide member 22 are connected by pins 232 through elastic members 233. Thus, armature plate 19 is securely held in position without vibration or noise. Moreover, the predetermined axial air gap between armature plate 19 and axial end plate 142 of pulley 14 is secured by the recoil strength of elastic members 233 because the predetermined position of these members is determined by flange portion 211 of spring cover 21. Therefore, the movement of the armature plate can be easily controlled and the predetermined gap can be readily maintained. Moreover, a more durable and reliable clutch is provided in accordance with the construction of the present invention.

The present invention has been described in detail in connection with a preferred embodiment. The embodiment, however, is merely an example and the invention is not restricted thereto. It will be understood by those skilled in the art from a reading of the specification that variations and modification can be made within the scope of the present invention as defined by the appended claims.

I claim:

1. In an electromagnetic spring-wound clutch including a first rotatable member having an axial end plate of magnetic material, a second rotatable member coaxially positioned with respect to said first rotatable member, an armature plate member coaxially positioned with respect to said first rotatable member and frictionally engageable therewith, a coil-wound spring wound around a portion of said first rotatable member and being connected at its respective ends to said second rotatable member and said armature plate member, a cover plate fixed to said second rotatable member and covering the outer peripheral surface of said coil-wound spring, and electromagnetic means associated with said axial end plate of said first rotatable member for attracting said armature plate member to said xial end plate so that rotation of said first rotatable member is transmitted to said second rotatable member through said armature plate member and said coil-wound spring by the operation of said electromagnetic means, the improvement comprising a guide member disposed on said cover plate and coaxially rotating with said first rotatable member when said clutch is engaged, said armature plate being connected to said guide member by a plurality of connecting members to maintain a predetermined axial air gap between said axial end plate of said first rotatable member and said armature plate, each of said plurality of connecting members including an elastic member, said cover plate having a radial flange portion which prevents axial movement of said guide member and said armature plate.

2. The electromagnetic spring-wound clutch of claim 1 wherein each of said plurality of connecting members comprise a cylindrical member and a pin disposed through said cylindrical member, said elastic member being disposed on said guide member and providing an air gap between said cylindrical member and said pin, said armature plate being fixed on an end portion of said pin extending from said cylindrical member.

3. The electromagnetic spring-wound clutch of claim 2 wherein said guide member is formed with a plurality of holes and a plurality of said cylindrical members are closely fitted in respective said holes.

4. The electromagetic spring-wound clutch of claim 3 wherein each of said cylindrical members has a radial flange at a respective end to limit axial movement thereof.

5. The electromagnetic spring-wound clutch of claim 1 wherein said cover plate has a bent portion at its axial terminal end and said guide member is fitted on a first axial end portion of said bent portion.

6. The electromagnetic spring-wound clutch of claim 5 wherein said armature plate member is fitted on a second axial end portion of said bent portion in response to the bias strength of said elastic member when said electromagnetic means is not operated.

7. The electromagnetic spring-wound clutch of claim 1 wherein said guide member is rotatable with respect to said cover plate.

8. An electromagnetic spring-wound clutch comprising:
    a first rotatable member having a frictional axial end surface formed of magnetic material;
    a second rotatable member coaxially positioned with respect to said first rotatable member;
    an armature plate member coaxially positioned with respect to said first rotatable member and frictionally engageable with said first rotatable member;
    a coil-wound spring wound around a portion of said first rotatable member and being connected at its respective ends to said second rotatable member and said armature plate member, respectively;
    a cover plate fixed to said second rotatable member to cover the outer peripheral surface of said coil-wound spring and having a bent portion at an outer terminal end portion thereof;
    electromagnetic means associated with said axial end surface of said first rotatable member for attracting said armature plate member to said axial end surface so that rotation of said first rotatable member can be transmitted to said second rotatable member through said armature plate member and said coil-wound spring;
    a guide member rotatable disposed on an outer peripheral surface of said cover plate and fitted against one axial end of said bent portion to maintain an axial position thereof;
    a plurality of connecting members fixedly disposed on said guide member and connected to said armature plate, each of said plurality of connecting members including an elastic member; and
    a radial flange portion disposed on said cover plate which prevents axial movement of said guide member and said armature plate.

* * * * *